US012572767B2

(12) United States Patent
Moal et al.

(10) Patent No.: US 12,572,767 B2
(45) Date of Patent: Mar. 10, 2026

(54) METHOD FOR PROCESSING DATA FROM ONE- OR TWO-DIMENSIONAL CODE, AND CORRESPONDING DEVICES AND PROGRAM

(71) Applicant: OXYLEDGER, Brest (FR)

(72) Inventors: Xavier Moal, Guipavas (FR); Sylvain Guyomarch, Plouzané (FR)

(73) Assignee: OXYLEDGER, Brest (FR)

( * ) Notice: Subject to any disclaimer, the term of this patent is extended or adjusted under 35 U.S.C. 154(b) by 0 days.

(21) Appl. No.: 18/722,039

(22) PCT Filed: Dec. 21, 2022

(86) PCT No.: PCT/EP2022/087202
§ 371 (c)(1),
(2) Date: Jun. 20, 2024

(87) PCT Pub. No.: WO2023/118277
PCT Pub. Date: Jun. 29, 2023

(65) Prior Publication Data
US 2025/0124244 A1     Apr. 17, 2025

(30) Foreign Application Priority Data
Dec. 21, 2021     (FR) ...................................... 2114185

(51) Int. Cl.
*G06K 7/14*          (2006.01)

(52) U.S. Cl.
CPC ......... *G06K 7/1413* (2013.01); *G06K 7/1417* (2013.01)

(58) Field of Classification Search
CPC .... G06K 7/1413; G06K 7/1417; G16H 40/20; G16H 10/60; G06F 40/211
See application file for complete search history.

(56) References Cited

U.S. PATENT DOCUMENTS

| | | | |
|---|---|---|---|
| 5,627,358 A | 5/1997 | Roustaei | |
| 2009/0066509 A1 | 3/2009 | Jernstrom et al. | |
| 2011/0207531 A1* | 8/2011 | Gagner | ............... G07F 17/3225 |
| | | | 463/43 |

FOREIGN PATENT DOCUMENTS

| | | |
|---|---|---|
| FR | 3053811 A1 | 1/2018 |
| FR | 3053811 B1 | 9/2018 |
| WO | 2010056729 A1 | 5/2010 |

OTHER PUBLICATIONS

International Search Report dated Mar. 27, 2023 for corresponding International Application No. PCT/EP2022/087202, filed Dec. 21, 2022.

(Continued)

*Primary Examiner* — Matthew Mikels
(74) *Attorney, Agent, or Firm* — David D. Brush; Westman, Champlin & Koehler, P.A.

(57)          ABSTRACT

A data processing method implemented within a data processing device. The method includes at least one iteration of the following steps: obtaining a character string; storing the character string in a buffer memory that is accessible to a processing application executed by a browser within the electronic device; syntactically analysing the character string by using the application, the syntactic analysis continuously determining the presence of a prefix having a predetermined form at the beginning of the character string stored in the buffer memory; and extracting a character substring from the character string using the prefix if said prefix is present, otherwise clearing the buffer memory; transmitting the extracted character substring to a server application.

12 Claims, 4 Drawing Sheets

(56)  References Cited

OTHER PUBLICATIONS

Written Opinion of the International Searching Authority dated Mar. 27, 2023 for corresponding International Application No. PCT/EP2022/087202, filed Dec. 21, 2022.

French Search Report and Written Opinion dated Jul. 25, 2022 for corresponding French Application No. 2114185, filed Dec. 21, 2021.

Brockfeld Peter, "GitHub—PeterBrockfeld/BarcodeParser: The barcode parser is a library for handling the contents of GS1 barcodes.", Feb. 18, 2015 (Feb. 18, 2015), Retrieved from the Internet: URL:https://github.com/PeterBrockfeld/BarcodeParser, XP055945192.

GS1, "GS1 General Specifications Release 21.0.1", Jan. 31, 2021 (Jan. 31, 2021), XP009537689.

* cited by examiner

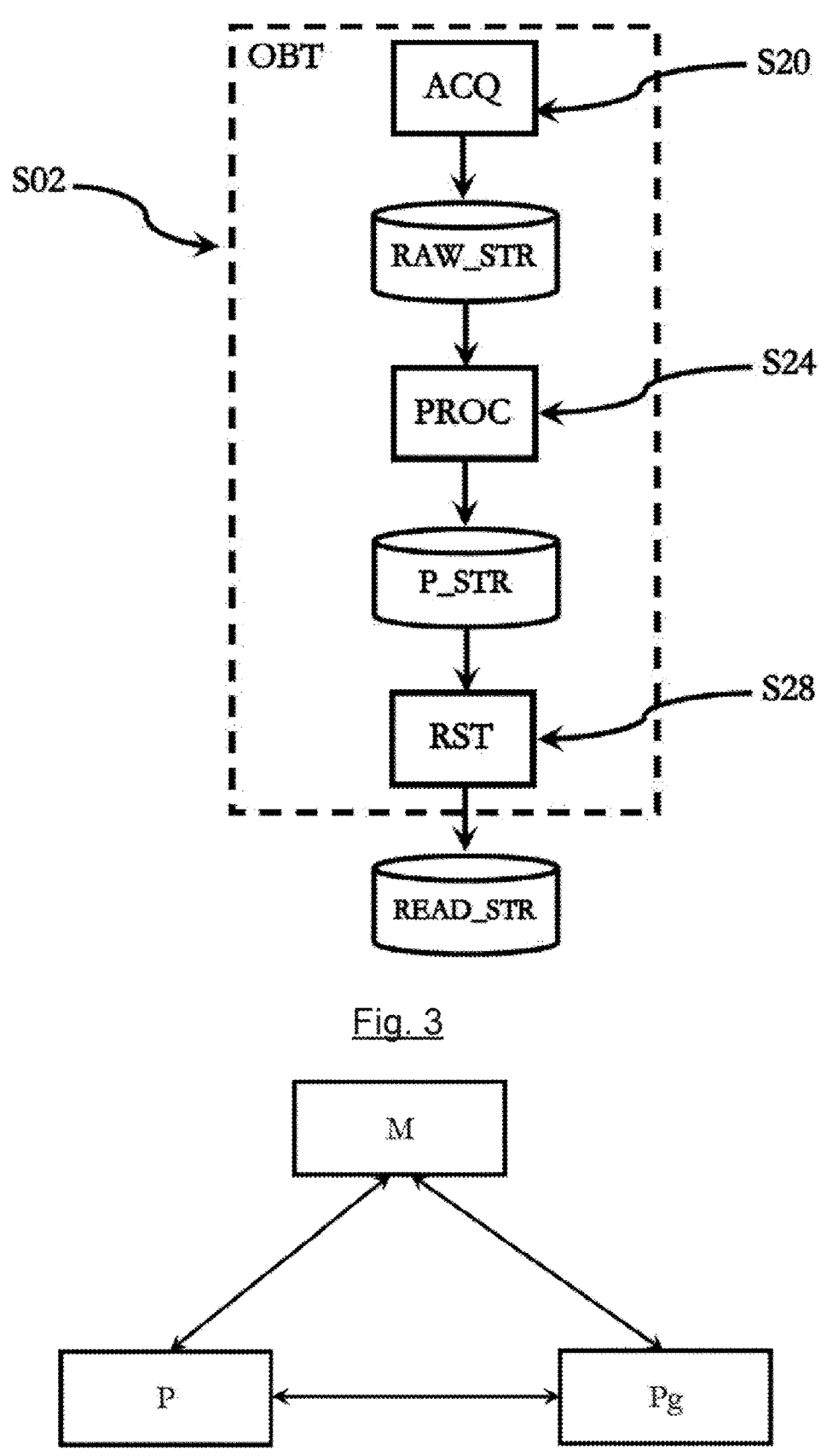
_Fig. 3_
_Fig. 6_

METHOD FOR PROCESSING DATA FROM ONE- OR TWO-DIMENSIONAL CODE, AND CORRESPONDING DEVICES AND PROGRAM

CROSS-REFERENCE TO RELATED APPLICATIONS

This Application is a Section 371 National Stage Application of International Application No. PCT/EP2022/087202, filed Dec. 21, 2022, and published as WO 2023/118277 A1 on Jun. 29, 2023, not in English, which claims priority to French Patent Application No. 2114185, filed Dec. 21, 2021, the contents of which are hereby incorporated by reference in their entireties.

1. FIELD OF THE INVENTION

The invention relates to the field of medical data processing, and more particularly the processing of technical data produced in the context of an implantation of an implantable medical device (or IMD) or a medical device (MD) used for the implementation of an implantable medical device.

The term implantable medical device can designate a medical device intended to be totally or partially introduced, by surgical or medical means, into the human body, or by a medical procedure into a natural orifice, and which is intended to remain there after the procedure.

2. PRIOR ART

The traceability of IMD and MD is imperative and is strictly regulated. More specifically, each IMD must be locatable in any location and at any time, from its manufacture to the end of its life-cycle, including and above all during its implantation—this being the most critical stage in the life-cycle. This requires each IMD to be unambiguously identified using an IMD identifier. Good traceability at the time of implant then makes it possible to manage any recalls of batches (implanted or otherwise).

In addition, IMD are becoming more complex from year to year, due to their increasing connectivity, their made-to-measure manufacture, the more and more technical and biocompatible materials, or else their design which includes ever more sensors. This increasing complexity, as well as the extremely strict regulations accompanying it, requires extensive and precise monitoring of each IMD implanted. IMD manufacturers must identify, trace and evaluate the compliance of IMD products (in particular through post-market surveillance (PMS)). In particular, data collection in PMS is an essential procedure in the context of the production of a given IMD, in order to evaluate the risk-benefit ratio of this IMD, that is essential for maintaining the certification authorising the marketing of this IMD. This data reporting and traceability are, in addition, an essential element in building and maintaining confidence between patients, medical authorities and IMD manufacturers.

Currently however, there is a significant lack of organisations and computing resources for performing satisfactory IMD traceability. The computing resources (hardware and software) implemented in healthcare establishments are incomplete and disparate. This concerns the effective obtaining of data (in particular at the time of an implantation), their collection, their centralisation and their processing, these various steps being used to establish the healthcare traceability of implanted IMD, throughout their life cycle.

Data entry relating to an IMD, as currently performed, is also not very ergonomic, because it is entirely unsuitable for entry during an implantation, in particular within an operating theatre. The data relating to an IMD during implantation are in general entered in a handwritten manner. This can be carried out, for example, in an operational notebook, into which the identifiers of the IMD are copied, and additional information is handwritten next to the identifiers. This additional information may relate to a given IMD or to its implantation—typically in the event of a problem during implantation of the IMD or its failure. Thus, the entry of these data (IMD identifiers and additional information) is cumbersome and a source of errors.

The collection and processing of these data once entered, although essential, is also extremely cumbersome and generates errors. More specifically, it is necessary to collect all the data entered by hand, and record these in an appropriate database.

The consequence of these deficiencies in data management relating to IMD, both for entry and processing, is that only a minority of patients are able to recover data from the implantation of an IMD concerning them, and this recovery is furthermore not traced in the majority of cases. In addition, the report resulting from these data is in general partial, with disparate data entry and having a large number of errors. This leads to recurrent disputes between patients and hospital services. Solving these disputes requires long manual procedures—in particular searching for manually-entered raw data, when it exists. This phenomenon is growing with the increase in the number of IMD implantations. There is thus a need for a more automated data entry that is suitable for the requirements specific to medical procedures.

A first approach could be the use of barcodes to identify IMD, less prone to error than a handwritten entry. Such barcodes are read using a barcode reader, commonly called a barcode scanner. By way of example, patent FR 3053811 describes a method for identifying medical devices using a barcode. This makes it possible to identify a medical device and, in particular, an IMD. However, the method is essentially only usable for managing stocks of IMD within a healthcare establishment. Furthermore, the method described in FR 3053811 does not enable automated entry of data other than the identifiers of medical devices. In addition, this method is not suitable for use in an operating theatre during an implantation, especially when it is necessary to enter additional information relating to the IMD and its implantation. Hence, during an implantation, the nursing staff can certainly enter identifiers more reliably by scanning them but, on the other hand, the additional information necessary for good traceability of the IMD still remains manually entered.

This is manifest in practice by simply gluing, into an operating notebook, the barcode identifying the IMD to be implanted. The additional information accompanying this identifier are then entered by hand. The problem of entering and processing these data therefore remains unsolved.

In other cases, the barcode is read by a barcode scanner (and therefore read indirectly by a computer), but the additional information still remains manually entered, using a keyboard and a mouse. This certainly streamlines the data processing part, since the data are recorded directly in a computer, but the data entry (especially for the additional information) per se remains cumbersome for users, and is a source of all kinds of errors. Here too, the obstacles to good IMD traceability remain.

Furthermore, the entry of additional information, whether using a keyboard and mouse or a pen, poses significant hygiene risks within the operating theatre. It is necessary to disinfect the keyboard and/or the mouse to be used in addition to the barcode scanner, then to protect these three peripherals devices using a plastic film. This adds to the preparation of the operating theatre.

Unfortunately, the method of patent FR 3053811 also essentially relies on manual entry of information into a database, in particular the IMD manufacturer's code, which identifies the manufacturer of the IMD. Thus, this method remains incomplete in terms of data entry, and furthermore assumes knowledge of the codes which effectively relate to the manufacturer, which is not necessarily the case given the multiplicity of 1D or 2D codes present on an IMD box, or on the IMD itself.

In fact, the method of patent FR 3053811 thus only marginally simplifies data entry (essentially, the entry of medical device identifiers), which is very unsatisfactory.

3. DISCLOSURE OF THE INVENTION

The invention has been designed to overcome at least some of the disadvantages of the prior art.

The invention proposes a method, implemented within an electronic data processing device, comprising at least one iteration of the following steps:

obtaining an input character string originating from the reading of at least one barcode by an optical device;

storing the input character string in a buffer memory that is accessible to a processing application executed within a browser;

syntactic analysis, by means of the application, of the input character string, the syntactic analysis continuously determining the presence of a prefix having a predetermined form at the beginning of the input character string stored in the buffer memory, and extracting a character substring from the input character string using the prefix if said prefix is present, otherwise clearing the buffer memory;

transmitting the extracted character substring to a server application.

Thus, this method makes it possible to entirely automate the entry of information relating to an implantation, especially, particularly by improving the interfacing of the transmitted data with the application, without limiting the reactivity of this application, especially during keystrokes performed on the keyboard of the electronic device. This method is all the more advantageous because it is based on read character strings resulting from reading different barcodes. In other words, all of the manual part of the entry can be carried out using a single peripheral device (the barcode reader), the subsequent steps (formatting, processing, analysis, etc.) being automated by the "front-end" application and the server application. This constitutes a time-saving for users—when preparing an implantation and when entering it.

In addition, this method makes it possible to enter a large variety of barcodes, in particular barcodes relating to the additional information to be entered and associating it with an IMD. Thus, the entire data entry process is automated, which represents a time-saving and a reduced source of errors.

Finally this method is executed in a browser. This enables this method to be implemented on a wide variety of computer terminals and operating systems, considerably reducing problems of compatibility between the different types of computer terminals used; personal computer, tablet, smartphone, etc.

The transmission of data to a server application further simplifies the collection of data and their centralisation, for the purposes of processing and traceability. The optimised management of the buffer memory according to the invention, streamlines communication between the computer terminal and the server and further makes it possible to distinguish the manual entries from the automatic entries.

According to a particular feature, the extracting of the character substring comprises, when the prefix is present in the input character string, determining the presence of a predetermined suffix in the input character string, and determining the character substring using the prefix and the suffix.

The joint use of the already identified prefix and of the suffix makes it possible to rapidly extract the character substring, the lightness of the operation streamlining the entire method.

According to a particular feature, the obtaining of the input character string comprises:

a step of acquiring a raw character string from the reading of the barcode by the optical device, a step of identifying, within the raw character string, the presence of control characters belonging to a predetermined group of control characters, a step of replacing, within the raw character string, each of the control characters identified by a respective predetermined substitution character string, delivering a processed character string, a step of restoring the input character string from the processed character string.

The replacement of the control characters by judiciously chosen substitution character strings makes it possible to avoid these control characters interfering with the transmission, during a transmission from the optical reader to the application. For example, this avoids the case where a part of the input character string comprising one of these control characters is interpreted by one of the elements of the transmission stack (operating system, driver, browser, etc.) as an instruction and not as a keyboard entry. This also avoids the problems of encoding during the transmission.

According to a particular feature, the substitution character string of a control character comprises the concatenation, in order, of a control character prefix, a character string representative of the control character and a control character suffix, the control character prefix and the control character suffix being common to the control characters.

This exemplary embodiment has the advantage of having substitution character strings of similar size, standardising and easing their processing. The size of these substitution character strings can be reduced, which reduces the time between data entry and the display of this entered data for a user. In addition, this type of substitution character string makes it possible to avoid almost any clash with one of the pre-existing barcode standards.

According to a particular feature, restoring the input character string comprises:

obtaining a symbology character string representative of the symbology of the barcode from which the raw character string is derived;

restoring, as input character string, the concatenation, in order, of the prefix, the symbology character string, the processed character string and the suffix.

syntactic analysis of the resulting input character string is thus facilitated, taking account of the explicit indication of the symbology of the payload transported by the input character string.

According to a particular feature, the storing of the input character string in the buffer memory comprises, for each read character of the input character string emulating a keyboard event representative of said read character, and writing into the buffer memory the read character from the emulated keyboard event.

The use of a keyboard event emulation, for example of the KeyboardEvent type for the Mozilla Firefox browser, makes it possible to transmit the input character string to the application, character by character. In addition, it is possible to optimise this transmission, by analysing the characters one by one, as will be seen below.

According to a particular feature, the writing of the read character is ignored if the keyboard event belongs to a group of predetermined events.

This group of events, which may comprise for example the keys Alt, CapsLock, Control, Fn, NumLock, Process, Shift . . . , can interfere with the application, because this is executed by a given browser within a given operating system. This thus avoids entry incidents, for example loss of focus on the browser, or a tab of this browser, executing the application, or closure of one of the elements of the transmission stack, etc.

According to a particular feature, the writing of the read character into the buffer memory comprises the clearing of the buffer memory before the effective writing of the read character if the duration between the keyboard event and a preceding keyboard event exceeds a predetermined threshold.

This additional condition makes it possible to distinguish the manual entries carried out on the keyboard from the emulation of keyboard events induced by obtaining the data by reading, a manual entry being typically much slower than the emulation of keyboard events. It is also possible to have an adaptive threshold in order to distinguish the manual entries, at an unsteady rhythm, from the much more regular result of the emulation of keyboard events.

In an exemplary embodiment, the predetermined threshold is approximately 500 ms. This threshold value is a compromise between too low a threshold—the least slowing down of the transmission stack reader/application leading to an undue clearing of the buffer memory—and too high a threshold—this criterion no longer satisfactorily discriminating the manual entries from the emulation of keyboard events.

According to a particular feature, the various character strings (PREFIX, SUFFIX, C_PREFIX, C_SUFFIX, AIM_ID, SUB_STR) added during the method comprise characters included in the non-extended ASCII table. Thus, the input character string from the various method steps is encoded in a non-extended ASCII format, thus guaranteeing compatibility with a very large number of operating systems and browsers.

According to a particular feature, the prefix starts with the character string "{@}". This particular character string has several advantages. The left curly bracket character "{" (and the right curly bracket character) usually requires simultaneously pressing two keys of a keyboard (for example AltGr and key 4 in AZERTY layout), which makes a manual entry comprising this character improbable, while respecting the criterion of a reduced delay between two keyboard events. Employing this bracket character before the the at character @ makes it possible to prevent entering an email address from interfering with the emulation of keyboard events, unless that email address comprises a left curly bracket just before the at character. This choice of prefix start also as the advantage being able to enter e-mail addresses (with an at symbol) without interception by the method of the invention (in other words, without cancelling the propagation of the keyboard event linked to the striking the @ key, since it is never preceded by the left curly bracket "{"). If ever a user wanted to enter a left curly bracket, it would be sufficient for the user to strike the key twice (the first keystroke would see its propagation cancelled by the method, but the second would not). This counterpart concerning the left bracket key (rarely entered) makes possible the transparent integration of the method on a computer and within a browser. Similar features can be transcribed for any type of keyboard layout (QWERTY, for example) with different characters.

According to a particular feature, the transmission of the character substring to the server application comprises:

a step of determining the presence, within the character substring, of a symbology character string representative of the symbology of the barcode from which the character substring is derived;

a step of extracting a useful character string from the character substring and the symbology character string when present.

It is thus possible, during the processing of a character string, to identify the type of information transported. This makes it possible, in particular, to identify the format of the character sub-string, typically when the barcode from which the character string comes is a standard type.

According to a particular feature, the transmission of a common character substring comprises, if the current character substring does not have a symbology character string, obtaining a preceding character substring, transmitted at the preceding iteration, and if said preceding character substring includes a symbology character string relating to a barcode format of the type identifying a given device, combining the current character substring with the preceding character substring.

Thus, it is possible to use specific barcodes which are distinguished from standardised barcodes because they lack a symbology character string. These barcodes specific to the method, make it possible to carry out specific actions executed in the application. The absence of symbology makes these specific barcodes easier to transmit, without compromising the acquisition and processing of standard barcodes. The association of a specific barcode scanned following a standard barcode (identifying a given device) makes it possible to perform, within the application, an action on the given device. It is possible, for example, to perform an additional entry of information for a device scanned by means of the optical reader.

According to a particular feature, determining the presence of the symbology character string and the extracting of the useful data are performed by the server.

The maintenance of computer terminals present in the implantation is reduced to a minimum. An optional updating of the processing rules (for example in the case of introducing or modifying a new barcode standard) is then mainly carried out on the server application, which can be remote or dynamically loaded on the computer terminal. This centralisation also guarantees a high coherence in the processing of data from medical devices.

The invention also proposes an electronic data processing device (TERM), characterised in that it comprises:

means for receiving an input character string;

means for storing said input character string in a buffer memory that can be accessed by a processing application executed by a browser within the electronic device;

means for syntactic analysis, by the application, of the input character string, comprising means for continuously determining the presence of a prefix having a predetermined form, at the beginning of the input character string stored in the buffer memory;

means for extracting a character substring from the input character string using the prefix if said prefix is present, and means for otherwise clearing the buffer memory; and means for transmitting the extracted character substring to a server application.

According to a preferred implementation, the various steps of the methods according to the present disclosure are implemented by one or more software or computer programs, comprising software instructions intended to be executed by a data processor of an execution terminal according to the present technique and being designed to control the execution of various steps of the methods, implemented at a communication terminal, a remote server and/or chain of units, within the scope of a distribution of the processes to be carried out and determined by a scripted source code or a compiled code.

Consequently, the present technique also targets programs that can be executed by a computer or by a data processor, these programs including instructions to control the execution of steps of the method such as mentioned above.

A program may use any programming language, and be in the form of source code, object code, or byte code between source code and object code, such as in a partially compiled form, or in any other desirable form.

The present technique also targets an information medium that can be read by a data processor, and including instructions of a program such as mentioned above.

The information medium may be any entity or terminal capable of storing the program. For example, the medium may include a storage means, such as a ROM, for example a CD ROM or a microelectronic circuit ROM, or also a magnetic recording means, for example a mobile medium (memory card) or a hard drive or else an SSD.

On the other hand, the information medium may be a transmissible medium such as an electrical or optical signal, which may be routed via an electrical or optical cable, by radio or by other means. The program according to the present technique may in particular be downloaded on an Internet type network.

Alternatively, the information medium may be an integrated circuit in which the program is incorporated, the circuit being suitable for executing or for being used in the execution of the method in question.

According to an embodiment, the present technique is implemented by means of software and/or hardware components. In this regard, the term "module" may correspond in this document to a software component as well as to a hardware component or to a set of software and hardware components.

A software component corresponds to one or more computer programs, one or more subprograms of a program, or more generally to any element of a program or of software capable of implementing a function or a set of functions, according to what is described below for the module concerned. Such a software component is executed by a data processor of a physical entity (terminal, server, gateway, set-top-box, router, etc.) and is capable of accessing the hardware resources of this physical entity (memories, recording media, communication bus, input/output electronic cards, user interfaces, etc.).

In the same manner, a hardware component corresponds to any element of a hardware assembly capable of implementing a function or a set of functions, according to what is described below for the module concerned. This may concern a hardware component that can be programmed or with an integrated processor for executing software, for example an integrated circuit, a chip card, a memory card, an electronic card for executing firmware, etc.

Each component of the system described above of course implements its own software modules.

The various embodiments mentioned above can be combined with one another to implement the present technique.

4. LIST OF FIGURES

Other features and advantages of the invention will become clearer on reading the following description of an exemplary embodiment, given merely as an illustrative and non-limiting example, and of the accompanying drawings, in which:

FIG. 3 shows an example of obtaining an input character string of the method of FIG. 2;

FIG. 6 shows an example of a simplified structure of the device of FIG. 1.

5. DESCRIPTION OF EMBODIMENTS OF THE INVENTION 5.1 General Principle

Figures 1, 2:
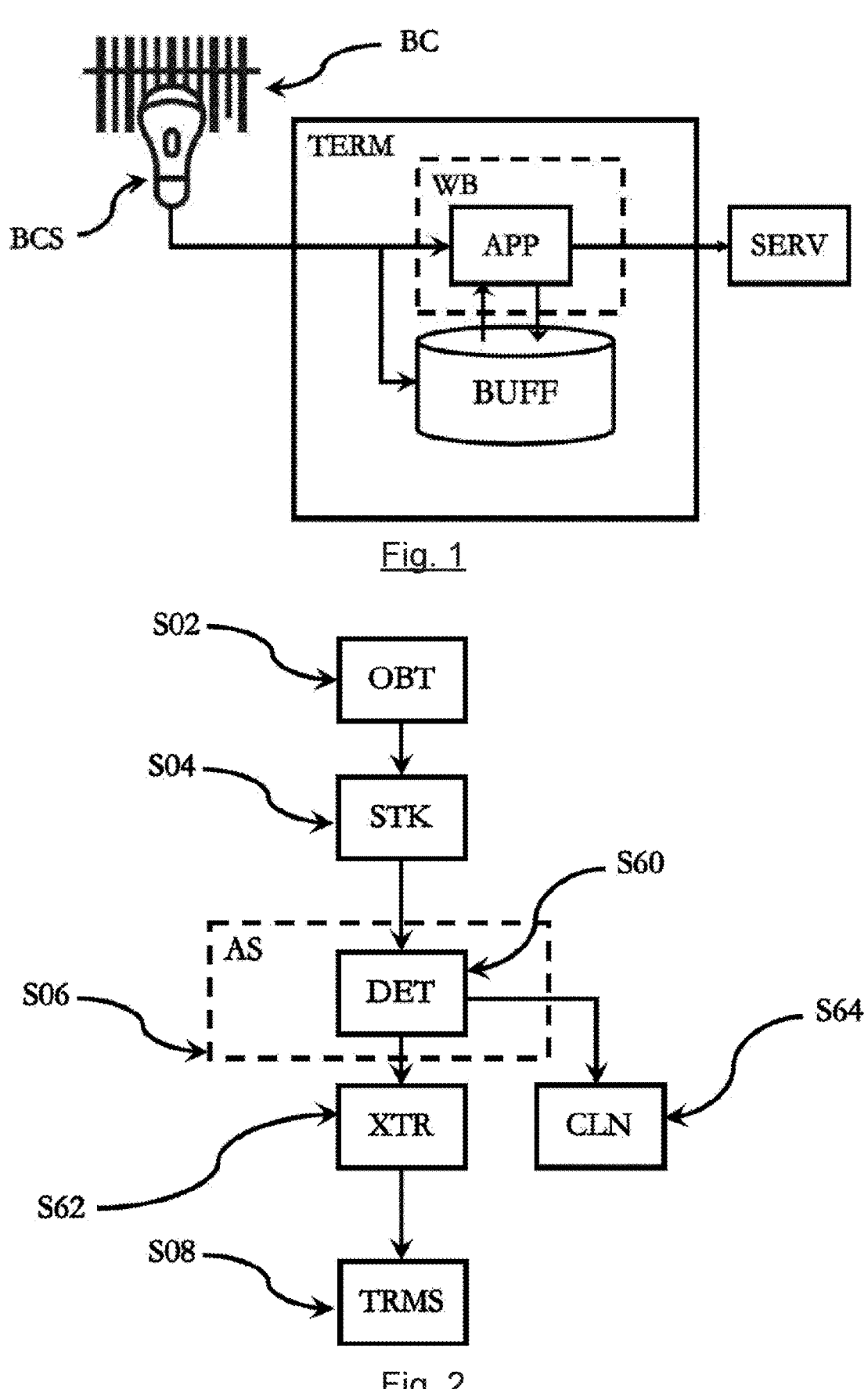
FIG. 1 shows a device implementing the method of the invention.
FIG. 2 shows the method according to the invention.

With reference to FIG. 1, an electronic data processing device according to the invention is described, comprising an optical reader BCS, in communication with a computer terminal TERM. The computer terminal TERM executes an application APP in a browser WB. The application APP communicates with a server SERV, for example remote from the computer terminal TERM.

The optical reader BCS is typically a barcode scanner. Depending on the operational implementation conditions, the optical reader and the computer terminal may be one and the same device. The optical reader BCS is configured to read a barcode and extract from it a character string READ_ STR. The optical reader BCS can read barcodes in one dimension (for example of the GS1-128, EAN-13, Code 39, Code 93 and Codabar types, etc.) or in two dimensions (for example of the QRCode, GS1-Matrix and Datamatrix types, etc.).

In certain cases, a barcode to be scanned can be very close to another barcode. In addition, certain barcodes used in the field of IMD, in particular those printed directly on an IMD, can be very small in size. In order to overcome these reading difficulties (to ensure that the correct barcode is scanned, whatever its dimensions), the optical reader BCS can project a light pattern, for example in the shape of a cross, intended to facilitate the targeting of the barcode to be scanned.

The optical reader BCS is connected to the computer terminal TERM. The computer terminal TERM is typically a personal computer, but could alternatively be a tablet, a smartphone, or any other apparatus suitable for receiving reading data. It is possible, for example, to incorporate the method according to the invention in a smartphone, the camera of the smartphone and the software of the smart-
phone being able to decode barcodes, in particular of the QR
code type.

The terminal TERM executes an application APP within
a browser WB. The browser is a common software, for
example Mozilla Firefox, Microsoft Edge, Safari or Google
Chrome. Executing the application APP within the browser
WB provides a very universal framework that a native
application could not provide—because it would depend far
too much on the specifics of the terminal TERM, and in
particular its operating system. By contrast, the browser can
be seen as a generic execution framework of the application
APP, which can therefore be used independently of the
operating system of the terminal TERM. The application
APP is typically an application executing with the resources
of the browser, and it is in the form of an application written
in a scripting language, for example of the javascript type.

However, the use of a browser WB for executing the
application APP gives rise to technical obstacles because the
transmission stack from the optical reader BCS to the
application comprises many elements, each in practice being
capable of interfering with the data from the reading of a
barcode on the one hand and capable of interfering with the
element to which it transmits the data which processes it, on
the other hand.

With reference to FIG. 2, a data processing method is
described for data coming from an optical reader, for
example. Such a method comprises a step of obtaining S02
the input character string STR_READ from, for example,
the reading of a barcode BC, a step of storing S04 the input
character string STR_READ, a step of syntactically analy-
sing 06 the input character string STR_READ and a step of
transmitting S08 the result of the syntactic analysis S06.

The input character string READ_STR comes, for
example, from the reading of at least one barcode BC by the
optical device BCS, as described above. The input character
string READ_STR is transmitted from the barcode reader
BCS to the application APP. The application APP stores the
input character string READ_STR thus received in a buffer
memory DB to which the application has access, before
processing.

At the time of the syntactic analysis S06, the application
APP determines, in a determination step S60, the presence
of a prefix PREFIX at the start of the input character string
READ_STR. The prefix is a predetermined character string,
known from the application APP. If this prefix PREFIX is
present, in other words it indeed forms the start of the input
character string READ_STR, then the application APP
carries out, in a step S62, the extracting of the "useful" data
included in the input character string READ_STR. If the
prefix PREFIX does not form the start of the input character
string READ_STR, then the application clears the buffer
memory DB in a clearing step S64.

The determination S60 is performed continuously, in
other words at the time when the application APP realises
the absence of the prefix at the start of the character string,
the application APP immediately clears the buffer memory
DB in step S64. This limits the quantity of data which are
effectively processed during the determination S60 of the
presence of the prefix PREFIX, which accelerates this step.

The aim of the extraction S62 is, in particular, to extract
a character substring from the input character string READ_
STR, this character substring comprising, among other
things, a payload. The extraction S62 is carried out using the
prefix, the presence of which has been detected, the char-
acter substring being located after the prefix.

Once the extraction S62 of the character substring is
carried out, in a transmission step S08 the application APP
communicates this character substring to the server appli-
cation SERV, which will perform additional processing on
this character substring.

5.2 Processing Control Characters

In an exemplary embodiment, shown in FIG. 3, the
obtaining S02 of the input character string comprises acquir-
ing S20 a raw character string RAW_STR originating from
the reading of the barcode BC by the optical device BCS, a
processing S24 of this raw character string RAW_STR
producing a processed character string P_STR and restoring
S28, as input character string READ_STR, the concatena-
tion of the prefix PREFIX and the processed character string
P_STR.

The aim of this processing S24 is, in particular, to avoid
any interference between the content of the raw character
string RAW_STR and the hardware and software elements
which form the transmission stack for this raw character
string RAW_STR, from the optical reader to the application
APP executing within the browser. This interference can, for
example, come from the presence, within the raw character
string RAW_STR, of control characters or special charac-
ters. These control characters may correspond to the hexa-
decimal values 0x00 to 0x31 of the ASCII table: NULL,
SOH, STX . . . US.

This processing S24 may comprise a step of identifying
the control characters present in the raw character string
RAW_STR, and replacing each of these control characters
by a respective substitution character string which does not
interfere with the transmission stack. Thus, a particular
character, which for example takes a given value for one
element of the transmission stack and another value for
another element of the transmission stack, will not be
misinterpreted and/or will not be a source of error through-
out the transmission between the various elements of the
transmission stack.

A control character can, for example, be replaced by a
character string comprising, in order, a control prefix, a
character string representative of the control character and a
control suffix. Here, the control prefix and the control suffix
are common to all the control characters. The character
string representative of the control character can, for
example, be in the form of two to three characters desig-
nating the control character. For example, for the control
character NUL, the resulting substitution string can be in the
form _OXYS_NUL_OXYE_, where _OXYS_ is the control
prefix, NUL the character string representative of the control
character NUL and _OXYE_ the control suffix. This choice
of substitution character string has several advantages:

the substitution character string is very quick to construct,
since it involves a concatenation of character strings, the substitution character strings of control characters are
almost the same size (in the described example, 18 to
19 characters)

the general form of these substitution character strings is
sufficiently specific that the probability of encountering
one in a raw character string RAW_STR is negligible
in practice. Thus, not only do the substitution character
strings not interfere with the elements of the transmis-
sion stack, but they do not interfere either with the
content of the input character string.

For the form of substitution character string described
above, this corresponds to a substitution character string
with maximum length of 152 bits (18 to 19 bytes). For a
connection between the optical reader and the computer
terminal having, for example, a bit rate of 9600 baud (bits per second), the transmission of a substitution character string takes 16 ms. If, for example, a barcode comprises three substitution characters, this will lengthen the transmission of the input character string (relative to the raw character string RAW_STR) by 52 ms. The inventors have determined in practice that this constraint added by the processing method was acceptable for a user, in exchange for the guarantee to the user and for the application APP to not have interference between the input character string and the elements of the transmission stack (or of the payload).

5.3 Processing the Symbology of Barcodes

In another exemplary embodiment, compatible with the processing of the special characters described above, the input character string READ_STR is terminated by a predetermined suffix SUFFIX, typically in a form equivalent to the prefix.

The extracting S06 of the character substring of the input character string then comprises, when the prefix is present, identifying the suffix. The character substring is then extracted using the prefix and the suffix. The character substring can typically be the character string included between the prefix and the suffix. This simultaneous identification of the prefix and the suffix accelerates the extraction of the character substring, while improving its reliability.

In an exemplary embodiment, the method comprises, obtaining S02 the input character string READ_STR, identifying the symbology SYM of the barcode from which the raw character string (or reading character string) originates. On the basis of this identification, a symbology character string AIM_ID is obtained, and concatenated to processed character string P_STR. Following this concatenation, the prefix, the processed character string P_STR and the suffix are concatenated in that order. Synthetically, this gives an input character string READ_STR of the form <PREFIX><AIM_ID><P_STR><SUFFIX>. It is possible to reverse the places of the symbology string <AIM_ID> and the payload <P_STR>.

Alternatively, it is possible to carry out this incorporation of the symbology character string directly in the raw character string RAW_STR, for example in the absence of processing relating to the control characters. Alternatively, it is possible to do without the identifying of the symbology, and only restore the concatenation of the prefix PREFIX, the processed character string P_STR and the suffix SUFFIX.

The additional addition of the prefix and the suffix, of the symbology (in the form of the symbology character string) improves the processing of character strings transmitted to the server application.

The symbology is typically representative of a pre-existing barcode standard. It may, for example, involve the symbology of GS1-128, EAN-13, Code 39, Code 93 or Codabar (for 1D barcodes) or QRCode, GS1-Matrix or Datamatrix (for 2D barcodes).

In an exemplary embodiment, the reading of some barcodes, of a type specific to the application, does not involve the addition of a symbology character string. In other words, when the processed character string P_STR is of this barcode type, the symbology character string is empty. This makes it possible to reduce the size of a character string originating from the reading of a barcode specific to the application, and thus to reduce the latency between the reading of such a barcode and the processing of the character string which results, without needing to sacrifice the information carried by the input character string.

5.4 Transmission of the Input Character String to the Application

Figure 4:
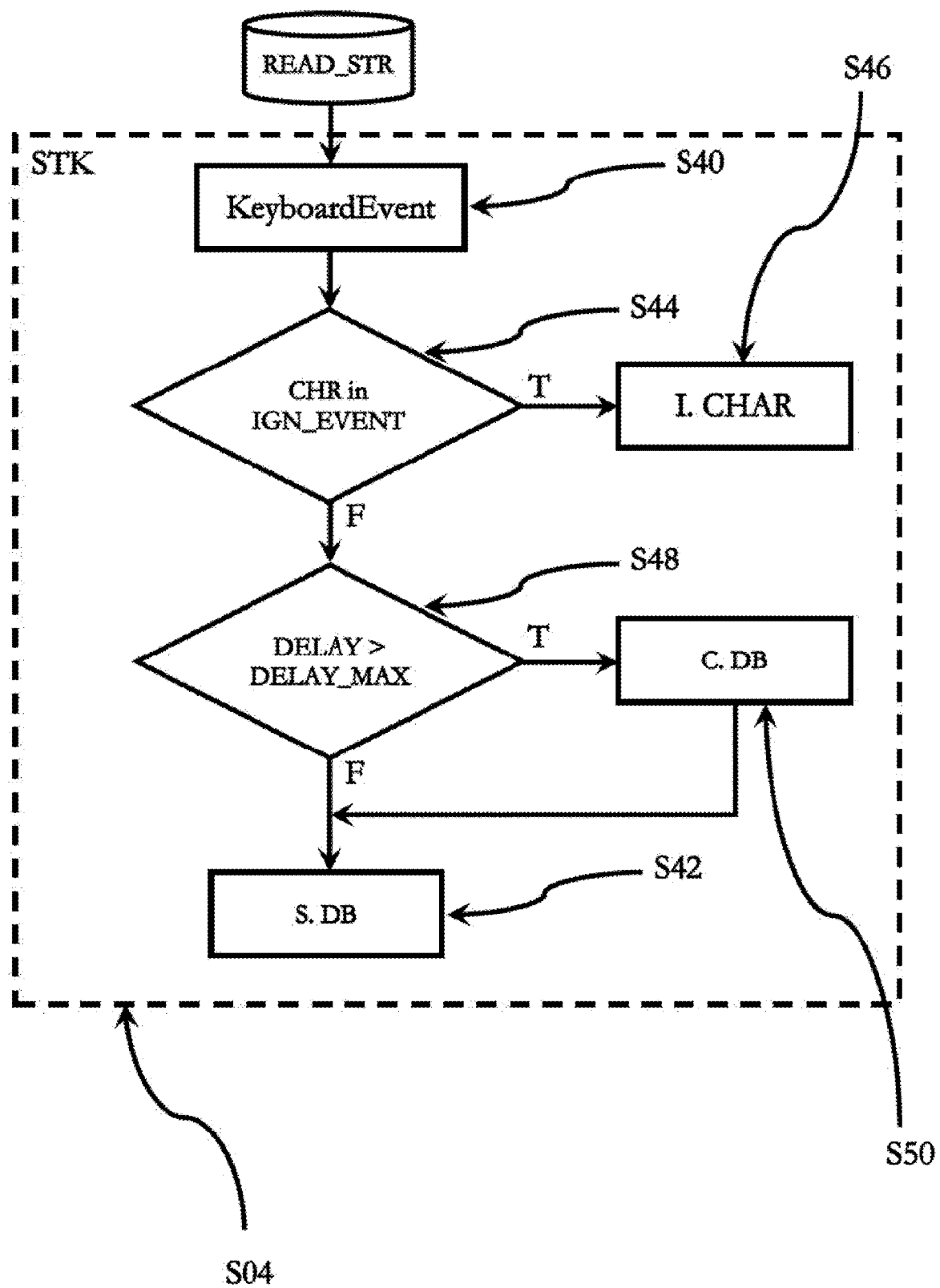
FIG. 4 shows an example of storing an input character string of the method of FIG. 2.

In an exemplary embodiment, shown in FIG. 4, the transmission of the input character string to the application, in particular its storage S04 in the buffer memory DB, is performed using an emulation of keyboard events. More precisely, the storage S04 comprises, for each read character of the input character string, the emulating S40 of a keyboard event representative of said read character, and the writing S42 in the buffer memory DB of said read character from the emulated keyboard event.

The emulating of the keyboard event can be, for example, of the KeyboardEvent type when the application is executed in the Mozilla Firefox browser.

This emulation enables transmission of the input character string to the application, character by character. This enables a certain amount of optimisations and processing on this character string during its transmission.

It is possible, for example, to determine, in a first step S44, whether the keyboard event of a read character belongs to a group of predetermined events IGN_EVENT. If this is the case, this character is ignored in a second step S46.

The group of events to ignore can typically comprise: Alt, AltGraph, CapsLock, Control, Dead, Fn, FnLock, Hyper, Meta, NumLock, Process, ScrollLock, Shift, Super, Symbol, SymbolLock. These events can interfere with the correct functioning of the application, in particular causing a loss of focus of the computer terminal on the application (in a tab of the browser), on the browser itself, or even close the browser or the tab executing the application.

As stated above, the emulation of keyboard events, character by character, makes it possible to perform a plurality of processes on the character string. This makes it possible, for example, to clearly distinguish a character string originating from a manual entry, at the keyboard of the computer terminal, from the input character string originating from the reading of the barcode.

In an exemplary embodiment, at each character produced by a keyboard event (emulated or not), the application measures in a third step S48 the duration separating the writing of this character from the writing of the last character having been written in the buffer memory DB. If this duration is greater than a certain threshold (in other words if too long a time passes between two keyboard events, emulated or not), the buffer memory DB is cleared in a fourth step S50. In other words, the application then estimates that it involves a manual keystroke (performed at a rhythm which is necessarily slower than that of an automated emulation of keyboard events) and stops taking account of the previously acquired data for the syntactic analysis.

The predetermined threshold may, for example, be fixed at approximately 500 ms. It involves a good compromise between too low a threshold—the least slowing down of the transmission reader/application stack leading to an undue clearing of the buffer memory—and too high a threshold—this criterion no longer satisfactorily discriminating the manual entries from the emulation of keyboard events. According to the invention, the buffer memory is cleared and the characters present in the buffer memory are released: they are normally transmitted to the browser for processing by same. Thus, a little time passes between a manual keystroke, carried out at the keyboard of the computer device, and a consideration of the actions resulting from this keystroke by the browser when the application determines that the characters that it receives do not originate from a barcode.

The condition of the maximum duration between two hits at the keyboard (characteristic of a sequence of keyboard events originating from a barcode reading) can be replaced or supplemented by a condition relating to the regularity of the keyboard events of the sequence. This makes it possible to discriminate the manual entries from the automatic entries, since the keyboard events produced by the emulation are considerably more regular than their manual equivalent.

In an exemplary embodiment, the various character strings implemented in the invention (PREFIX, SUFFIX, C_PREFIX, C_SUFFIX, AIM_ID, SUB_STR) and incorporated in the raw character string RAW_STR comprise characters included in the non-extended ASCII table. In a preferred exemplary embodiment, these various character strings consist exclusively of characters included in the non-extended ASCII table. This choice of encoding in non-extended ASCII avoids most of the interference caused by other types of encoding. This guarantees compatibility with a wide variety of operating systems and browsers, more generally of hardware and software units implementing the device.

In a preferred exemplary embodiment, the prefix stunts by the character string "{@}". This specific choice of character string has several advantages.

The character left curly bracket "{" usually requires pressing simultaneously two keys of a keyboard (for example AltGr and the 4 key on an AZERTY keyboard). An inadvertent manual entry of all of this sequence is thus improbable, in particular when respecting the delay condition between two keystrokes. Indeed, the entry of a curly bracket character (left or right) jointly with that of an at symbol is highly improbable, the at symbol being essentially used for entering email addresses.

Thus, discriminating the presence of a prefix starting with this character string "{@}" makes it possible, by analysing only three characters, to immediately determine whether a sequence of keyboard events is present, originating or not from an input character string.

In an exemplary embodiment, the transmission of the character substring to the server application comprises determining the presence of the symbology character string AIM_ID in the sub-string of transmitted characters. The remainder of the character substring then forms a payload, and comprises the processed character string P_STR.

When a current character substring does not comprise the symbology character string AIM_ID, this can signify that the barcode from which the current character substring originates, relates to one of the specific actions to be executed by the application. In this case, during the transmission, it is checked whether the preceding character substring transmitted comprises a symbology character string AIM_ID. If this is the case, and if its symbology relates to identifying an IMD, the current character substring is associated with said IMD identifier. This makes it possible to perform, via a simple reading of a barcode specific to the application, an action on an IMD for which the identification barcode has been read.

The action specific to the application can be the addition of an additional piece of information relating to the IMD. For example, the additional information may concern the addition of an IMD to a database, a feedback on the implantation of the IMD (with success, with error, or failed implantation), or the recording of an undesirable event relating to the IMD (for example: "broken screw", "damaged device", "non-compliant device", etc.) during its lifecycle.

The absence of symbology of the barcodes specific to the application makes these barcodes easier to transmit. This specification is transparent with respect to standard barcodes and their processing. The association of a specific barcode scanned following a standard barcode (identifying a given device) makes it possible to perform, within the application, an action on the given device without having to use an additional peripheral device (keyboard, mouse, touchscreen), which is a particular advantage in certain situations, for example when contamination on these peripheral devices is avoided (for example in an operating theatre).

In an exemplary embodiment, determining the presence of the symbology character string and extracting the useful data are performed within the server application. This centralisation of the detection of the symbology within the character sub-string, and thus all of the various processes performed on it, guarantees the coherence of the processing of the data originating from the IMD via the application, in particular in the event of an update.

5.4 Continuous Determination

Figure 5:
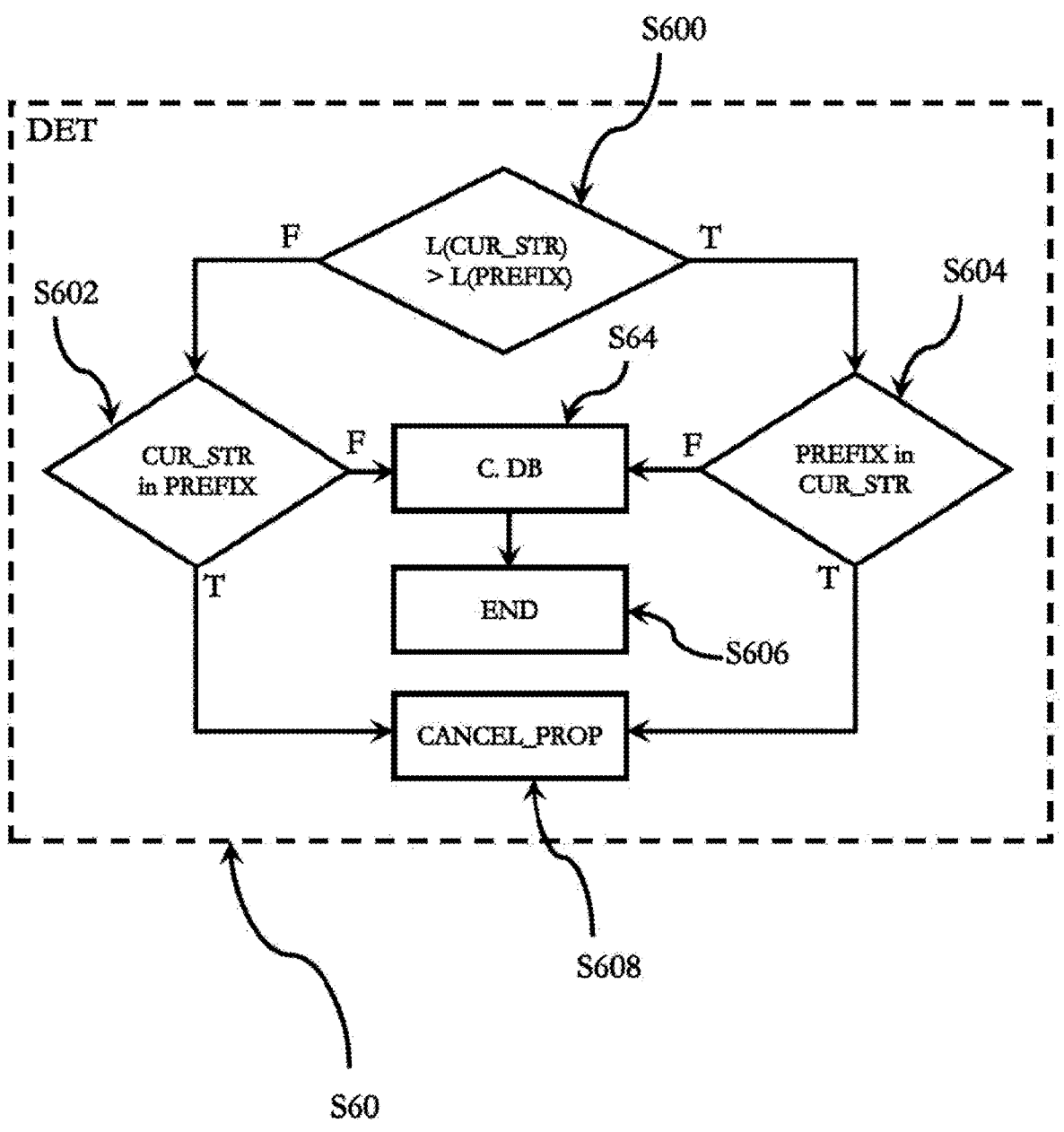
FIG. 5 shows an example of continuously determining the presence of the prefix of the method of FIG. 2.

In an exemplary embodiment, shown in FIG. 5, the continuous determination S60 of the presence of the prefix PREFIX within the input character string READ_STR is performed in the following manner: at each character written in the buffer memory DB:

1. obtaining of the current character string CUR_STR written in the buffer memory DB;
2. determining S600 whether the size L(CUR_STR) of the current character string CUR_STR is less than the size L(PREFIX) of the prefix PREFIX,
2a. then verifying S602 whether the current character string CUR_STR constitutes the start of the prefix PREFIX,
2b. otherwise, checking S604 whether the prefix PREFIX constitutes the start of the current character string CUR_STR.

A negative response from one of these two steps 2a or 2b leads to the clearing S64 of the buffer memory DB and stops S606 the analysis of the input character string READ_STR.

A positive response from one of the two steps 2a or 2b leads to the cancellation S608 of the propagation of the event (CANCEL PROP). In other words, the current keyboard event is not processed as a manual keyboard event (for example the writing of a character in a field) but as a keyboard event originating from the reading of a barcode. The remainder of the analysis, including the extraction S62, can then be performed.

5.5 Devices

With reference to FIG. 6, the various means implemented in the processing of the character strings originating from a barcode are described.

The application APP comprises means APP1 for receiving the input character string coming from the optical reader, means APP2 for storing said input character string in the buffer memory DB, means for syntactically analysing APP3 said input character string and means APP4 for transmitting the character string thus analysed to the server SERV.

The analysis means APP3 comprise determination means APP30, extraction means APP31 and clearing means APP32. The determination means APP30 are designed to continuously determine the presence of the prefix of predetermined form at the start of the input character string stored in the buffer memory. The extraction means APP31 are designed to extract a character substring from the input character string stored in the buffer memory using the prefix when the input character string starts with said prefix. The clearing means APP32 are designed to clean (or clear) the buffer memory in the absence of the prefix at the start of the input character string stored in said buffer memory. The transmission means are designed to transmit the extracted character substring to a remote server of the computer terminal.

The previously described means can be in the form of a particular processor implemented within a terminal, such as a personal computer, a tablet, a smartphone or a module directly incorporated within an optical reader. According to a particular exemplary embodiment, the computer terminal TERM implements all of the above described means.

For example, the computer terminal TERM comprises a memory M, comprising a buffer memory DB, a general processing processor P, equipped for example with a microprocessor, and controlled by a computer program Pg, and/or a secure memory, these computing elements implementing data processing methods, such as those described above, for processing data originating from the reading of a barcode.

In order to communicate with the remote server, the computer terminal comprises, in addition to the memory, communication means, such as communication network modules, data transmission means and data transmission circuits between the computer terminal and the server, and between the computer terminal and the barcode reader.

According to an exemplary embodiment, the optical reader BCS implements the steps for processing the raw character string, in particular the steps for processing the control characters. This enables the optical reader to deliver, directly to the computer terminal, character strings that are free from interference linked to the presence of control characters.

The invention claimed is:

1. A data processing method, implemented within an electronic data processing device, wherein the method comprises at least one iteration of:

obtaining an input character string by concatenating, in order, a prefix of predetermined form and a character string originating from reading at least one barcode by an optical device;

storing the input character string in a buffer memory that is accessible to a processing application executed by a browser within the electronic device, said storing comprising, for each read character of the input character string:

emulating a keyboard event representative of said read character; and writing into the buffer memory the read character from the emulated keyboard event;

syntactic analysis of the input character string by the application, the syntactic analysis comprising continuously determining presence of said prefix at a start of the input character string stored in the buffer memory; and in response to the prefix being present, extracting a character substring from the input character string using the prefix, the extracting comprising:

determining presence of a predetermined suffix in the input character string; and determining the character substring using the prefix and the suffix, otherwise clearing the buffer memory; and transmitting the extracted character substring to a server application of a server.

2. The data processing method according to claim 1, wherein the obtaining of the input character string comprises:

acquiring a raw character string originating from reading the barcode by the optical device, identifying, within the raw character string, presence of control characters belonging to a predetermined group of control characters, replacing, within the raw character string, each of the control characters identified by a respective predetermined substitution character string, delivering a processed character string, restoring the input character string from the processed character string.

3. The data processing method according to claim 2, wherein the substitution character string of a control character comprises concatenating, in order, a control character prefix, a character string representative of the control character and a control character suffix, the control character prefix and the control character suffix being common to the control characters.

4. The data processing method according to claim 2, wherein restoring the input character string comprises:

obtaining a symbology character string representative of a symbology of the barcode from which the raw character string is derived;

restoring, as input character string, a concatenation, in order, of the prefix, the symbology character string, the processed character string and the suffix.

5. The data processing method according to claim 1, wherein the writing of the read character is ignored if the keyboard event belongs to a group of predetermined events.

6. The data processing method according to claim 1, wherein the writing of the read character into the buffer memory comprises clearing the buffer memory before an effective writing of the read character if a duration between the keyboard event and a preceding keyboard event exceeds a predetermined threshold.

7. The data processing method according to claim 6, wherein the predetermined threshold is equal to approximately 500 ms.

8. The data processing method according to claim 1, wherein the transmission of the character substring to the server application comprises:

determining presence, within the character substring, of a symbology character string representative of a symbology of the barcode from which the character substring is derived, extracting a useful character string from the character substring and the symbology character string when present.

9. The data processing method according to claim 8, wherein the transmission of a common character substring comprises, if the current character substring does not have a symbology character string:

obtaining a preceding character substring, transmitted at a preceding iteration, and if said preceding character substring includes a symbology character string relating to a barcode format of a type identifying a given device, combining the current character substring with the preceding character substring.

10. The data processing method according to claim 8, wherein determining the presence of the symbology character string and extracting the useful character string are carried out within the server.

11. An electronic data processing device comprising:

at least one processor; and at least one non-transitory computer readable medium comprising instructions stored thereon which when executed by the at least one processor configure the electronic data processing device to:

obtain an input character string by concatenation, in order, of a prefix of predetermined form and a character string originating from reading at least one barcode by an optical device;

store said input character string in a buffer memory that is accessible to a processing application executed by a browser within the electronic device, the storing comprising, for each read character of the input character string:

emulating a keyboard event representative of the said read character; and writing into the buffer memory the read character from the emulated keyboard event;

syntactically analyze, by the application, the input character string, comprising continuously determining presence of a prefix having a predetermined form, at a beginning of the input character string stored in the buffer memory;

in response to the prefix being present, extract a character substring from the input character string using the prefix, the extracting comprising:

determining presence of a predetermined suffix in the input character string; and determining the character substring using the prefix and the suffix, otherwise clearing the buffer memory; and transmit the extracted character substring to a server application.

12. A non-transitory computer readable medium comprising a computer program product stored thereon comprising program code instructions for implementing a data processing method, when the instructions are executed by a processor of an electronic data processing device, wherein the method comprises at least one iteration of:

obtaining an input character string by concatenating, in order, a prefix of predetermined form and a character string originating from reading at least one barcode by an optical device;

storing the input character string in a buffer memory that is accessible to a processing application executed by a browser within the electronic device, said storing comprising, for each read character of the input character string:

emulating a keyboard event representative of said read character; and writing into the buffer memory the read character from the emulated keyboard event;

syntactic analysis of the input character string by the application, the syntactic analysis comprising continuously determining presence of said prefix at a start of the input character string stored in the buffer memory; and in response to the prefix being present, extracting a character substring from the input character string using the prefix, the extracting comprising:

determining presence of a predetermined suffix in the input character string; and determining the character substring using the prefix and the suffix, otherwise clearing the buffer memory; and transmitting the extracted character substring to a server application of a server.

\* \* \* \* \*